United States Patent
Krammer

(10) Patent No.: US 11,270,828 B2
(45) Date of Patent: Mar. 8, 2022

(54) COVERING FOR ELECTROMAGNETIC COIL

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 1189 days.

(21) Appl. No.: 15/726,422

(22) Filed: Oct. 6, 2017

(65) Prior Publication Data

US 2018/0029480 A1    Feb. 1, 2018

Related U.S. Application Data

(63) Continuation of application No. PCT/EP2016/057604, filed on Apr. 7, 2016.

(30) Foreign Application Priority Data

Apr. 9, 2015    (DE) .................. 10 2015 206 365.8

(51) Int. Cl.
*H01F 27/02*    (2006.01)
*H01F 38/14*    (2006.01)
(Continued)

(52) U.S. Cl.
CPC .............. *H01F 27/02* (2013.01); *B60L 53/12* (2019.02); *H01F 38/14* (2013.01); *H02J 7/0042* (2013.01);
(Continued)

(58) Field of Classification Search
CPC ......... B60L 53/12; B60L 11/182; H02J 50/70; H02J 7/0042; H02J 50/10; H02J 7/025;
(Continued)

(56) References Cited

U.S. PATENT DOCUMENTS 8,319,474 B2 * 11/2012 Mitake ............... H02J 50/70
                                                            320/109
8,760,253 B2 *  6/2014 Hickox ............... H01F 27/22
                                                            336/61

(Continued)

FOREIGN PATENT DOCUMENTS

CN    101919011 A    12/2010
CN    102362406 A     2/2012
(Continued)

OTHER PUBLICATIONS

Chinese-language Office Action issued in counterpart Chinese Application No. 201680019217.4 dated Jun. 5, 2018 with English translation (twenty (20) pages).

(Continued)

*Primary Examiner* — Jared Fureman
*Assistant Examiner* — Michael J Warmflash
(74) *Attorney, Agent, or Firm* — Crowell & Moring LLP

(57) ABSTRACT

A cover device is provided for an electromagnetic coil. The electromagnetic coil is configured for the inductive transmission of energy between the electromagnetic coil and an electromagnetic counter coil. The cover is designed as a housing for the electromagnetic coil. The cover is designed for fastening the cover to an undercarriage of a vehicle. The cover is provided with a plurality of recesses for magnet guide elements, wherein the recesses are designed such that at least one magnet guide element can be inserted into each recess.

17 Claims, 5 Drawing Sheets

(51) Int. Cl.
*H02J 50/10* (2016.01)
*H02J 50/70* (2016.01)
*H02J 7/00* (2006.01)
*B60L 53/12* (2019.01)
*H02J 7/02* (2016.01)

(52) U.S. Cl.
CPC .............. *H02J 50/10* (2016.02); *H02J 50/70* (2016.02); *H02J 7/025* (2013.01); *Y02T 10/70* (2013.01); *Y02T 10/7072* (2013.01); *Y02T 90/12* (2013.01); *Y02T 90/14* (2013.01)

(58) Field of Classification Search
CPC .......... H01F 27/02; H01F 38/14; Y02T 10/70; Y02T 90/12; Y02T 90/14; Y02T 10/7072
See application file for complete search history.

(56) References Cited

U.S. PATENT DOCUMENTS

| | | | | |
|---|---|---|---|---|
| 9,583,253 | B2 * | 2/2017 | Islinger | H01F 41/005 |
| 2010/0219697 | A1 * | 9/2010 | Azancot | H02J 50/90 |
| | | | | 307/104 |
| 2011/0187317 | A1 | 8/2011 | Mitake et al. | |
| 2012/0025602 | A1 * | 2/2012 | Boys | H02J 50/402 |
| | | | | 307/9.1 |
| 2013/0181797 | A1 | 7/2013 | Hickox | |
| 2013/0244582 | A1 * | 9/2013 | Son | H04W 24/00 |
| | | | | 455/67.13 |
| 2015/0175025 | A1 * | 6/2015 | Barbul | B60L 53/38 |
| | | | | 320/108 |
| 2015/0367739 | A1 * | 12/2015 | Boser | B60L 53/124 |
| | | | | 320/108 |
| 2016/0141099 | A1 * | 5/2016 | Maekawa | H02J 50/12 |
| | | | | 307/104 |

FOREIGN PATENT DOCUMENTS

| | | | | |
|---|---|---|---|---|
| CN | 103208345 A | | 7/2013 | |
| DE | 10 2007 033 654 A1 | | 4/2008 | |
| DE | 10 2007 014 752 A1 | | 10/2008 | |
| DE | 10 2011 106 027 A1 | | 1/2013 | |
| DE | 102011106027 A1 | * | 1/2013 | ........... H01F 27/325 |
| DE | 10 2012 202 472 A1 | | 8/2013 | |
| DE | 20 2013 100 530 U1 | | 5/2014 | |
| DE | 202013100530 U1 | * | 5/2014 | ............ H01F 38/14 |
| DE | 10 2013 010 695 A1 | | 8/2014 | |
| DE | 10 2013 219 714 A1 | | 4/2015 | |

OTHER PUBLICATIONS

International Search Report (PCT/ISA/210) issued in PCT Application No. PCT/EP2016/057604 dated Jul. 7, 2016 with English translation (Six (6) pages).
German-language Written Opinion (PCT/ISA/237) issued in PCT Application No. PCT/EP2016/057604 dated Jul. 7, 2016 with English translation (Seven (7) pages).
German-language Search Report issued in counterpart German Application No. 10 2015 206 365.8 dated Oct. 5, 2015 with partial English translation (Twelve (12) pages).

* cited by examiner

COVERING FOR ELECTROMAGNETIC COIL

CROSS REFERENCE TO RELATED APPLICATIONS

This application is a continuation of PCT International Application No. PCT/EP2016/057604, filed Apr. 7, 2016, which claims priority under 35 U.S.C. § 119 from German Patent Application No. 10 2015 206 365.8, filed Apr. 9, 2015, the entire disclosures of which are herein expressly incorporated by reference.

BACKGROUND AND SUMMARY OF THE INVENTION

The invention relates to a cover device for an electromagnetic coil, wherein the electromagnetic coil is configured for the inductive transmission of energy between the electromagnetic coil and an electromagnetic counter-coil.

The field of the invention is the inductive charging of a chargeable battery of a vehicle. Vehicles, specifically vehicles having an electric drive system, incorporate chargeable batteries for the storage of electrical energy. The chargeable battery of a vehicle can be charged, for example, by connecting it to an external power source (e.g. by connection to a public electricity network). One approach to the automatic and wireless inductive charging of the vehicle battery involves the transmission of electrical energy for the charging of the battery by magnetic induction from the ground surface to the undercarriage of the vehicle, via the undercarriage clearance of the vehicle. The vehicle incorporates a "secondary coil" in the region of the vehicle undercarriage, wherein the secondary coil is connected to a chargeable electrochemical energy store of the vehicle, via an impedance adaptor (not described in greater detail here), and a rectifier. Externally to the vehicle, a primary coil is located, relative to which the vehicle, with the secondary coil, is to be positioned for the purposes of charging. The primary coil can also be described as the base or ground unit, as the primary coil is connected in an appropriate manner to the base surface, e.g. a parking space, c.f. document DE 10 2007 033 654 A1.

According to the prior art, DE 10 2011 014 752 A1 proposes that, for the prevention of interferences with a communication circuit adjoining a primary coil, shielding of the field of the primary coil is achieved by the use of a ferrite material. To this end, a housing component for the primary coil is described, which is designed for the accommodation of a cover element with a ferrite material, thereby providing a field-free space for the communication circuit.

One object of the present invention is the disclosure of a cover device for an electromagnetic coil, which appropriately improves the electromagnetic properties of the coil which is employed for the inductive transmission of energy between the electromagnetic coil and an electromagnetic counter-coil.

This and other objects are achieved by a cover device for an electromagnetic coil according to the invention. The cover is at least partially configured as a housing for the electromagnetic coil, wherein the cover is configured for the attachment thereof to an undercarriage of a vehicle. The cover incorporates a plurality of recesses for magnet guide elements. The recesses are configured such that at least one respective magnet guide element can be inserted into each recess.

The cover device therefore constitutes at least a partial housing for a secondary coil which can be integrated in a vehicle. Additionally, magnet guide elements can also be incorporated in the cover device, or installed in the latter. A cover device with insertable magnet guide elements has the property whereby, if magnet guide elements of this type are installed, in the event of a coupling of a secondary coil with an electromagnetic field, the flux thereof can deliberately be guided or directed by the coil cover by means of the guide elements, acting as magnet guides.

According to one embodiment of the invention, the cover device is provided with respective fixing devices for each insertable magnet guide element. Magnet guide elements are thus fixed, i.e. maintained in position, within or by the cover device, relative to the latter, where the elements are inserted.

It is also advantageous if each of the fixing devices is configured as a clamp. In this case, the retention of magnet guide elements in/on the cover device can be achieved by the clamping thereof in the cover device.

For example, the cover device can be provided with a slot and/or a clip for this purpose. The slot and/or the clip are configured such that they exert a clamping force upon an inserted magnet guide element, and clamp the latter in/on the cover device.

According to a preferred embodiment of the invention, at least one magnet guide element is inserted into each of the plurality of recesses. According to this embodiment, the recesses, which are appropriate for the accommodation of magnet guide elements, are occupied by magnet guide elements.

Preferably, the magnet guide elements in a cover device of this type are of cuboid design. The magnet guide elements are thus exceptionally simple and robust. The cuboid magnet guide elements can be of different respective dimensions, with respect to their cuboid form.

Alternatively, the magnet guide elements are configured in the form of a prism, with a parallelogrammatic cross section. In this manner, it is possible, in the case of an integrated secondary coil and an alternating magnetic field, to optimize the direction of lines of flux relative to the secondary coil. According to a further alternative, this can also be achieved by using magnet guide elements configured in the form of a winged cuboid.

With respect to the magnetic properties of the cover device, it can also be advantageous if some of the magnet guide elements are of cuboid design, some of the magnet guide elements are configured in the form of a prism with a parallelogrammatic cross section, and some of the magnet guide elements are configured in the form of a winged cuboid. Accordingly, the cover device incorporates magnet guide elements of different basic form.

Specifically, the basic forms indicated do not restrict the general application of other basic forms of magnet guide elements. Magnet guide elements can be configured, for example, with different prismatic forms, or with a similar prismatic form. A prism is understood as a polygonal body, or a body having a plurality of edges. Rounded prisms, i.e. prisms with rounded corners and/or edges, can also be employed.

It is moreover advantageous if the magnet guide elements are essentially composed of a soft magnetic material. Specifically, the soft magnetic material can be a ferrite material. Ferrites have a high magnetic conductivity, but a low electrical conductivity. Ferrites thus conduct electromagnetic fields with virtually no eddy current losses.

It is also useful if the cover device is provided with a screening plate. Screening plates have the property whereby, in the presence of an alternating electromagnetic field, eddy currents are generated which prevent a penetration of the plate by the alternating electromagnetic field, thereby shielding the region which is in the "electromagnetic shadow" of the plate. This is then advantageous if specific regions of the cover device are deliberately to be maintained in an alternating field-free state, e.g. in order to permit the accommodation of interference-sensitive control electronics.

It is moreover advantageous if the cover device incorporates at least one fixing device for the attachment to the undercarriage of the vehicle. Such fixing devices can be variously configured, e.g. as a pattern of holes for the accommodation of pins or screws.

According to a further embodiment of the invention, the cover device forms part of an electromagnetic coil unit having an electromagnetic coil, wherein the electromagnetic coil is connected to the cover device, and the cover device at least partially functions as a housing for the electromagnetic coil. The electromagnetic coil unit is additionally provided with magnet guide elements, which are inserted into recesses in the cover device. Magnet guide elements are inserted into all the recesses, or at least in a number of the recesses.

According to a further embodiment of the invention, a vehicle incorporates an electromagnetic coil unit of this type, wherein the electromagnetic coil unit is attached to the undercarriage of the vehicle, and the undercarriage of the vehicle, or components of the vehicle located in the region of the undercarriage of the vehicle, delimit the plurality of recesses in the cover device and the magnet guide elements inserted into the recesses. This means that the coil unit is fitted exactly on or in the undercarriage of the vehicle, such that the magnet guide elements inserted into the cover device, as a result of their individual size or specific positioning, fully occupy the structural space between the coil unit and the undercarriage. In this manner, the secondary coil, by the coupling of the magnetic field passing through the coil with the magnet guide elements in the cover device, is effectively enlarged. A secondary coil, as an intricate and complex component, can thus be universally installed in various vehicle types, and the effective size thereof can be modified, in accordance with the respective vehicle type, by means of the magnet guide elements. Consequently, only the cover device and the magnet guide elements need to be adapted to the undercarriage of the respective vehicle type. On a fully-developed secondary coil itself, and thus for the integration thereof in a vehicle, no design adjustments are required.

Overall, the invention is based upon the considerations set out below. In inductive charging, energy is transmitted across an air gap via a ground-mounted primary coil to a secondary coil on the underside of the vehicle. The air gap here ranges from approximately 7 cm to approximately 20 cm. This distance is dependent upon the undercarriage clearance of the vehicle and upon the structural height of the primary coil. As a result of numerous marginal conditions on the vehicle, the size of the secondary coil is substantially limited, or substantially dictated.

The quality of coupling between the two coils during charging essentially dictates the efficiency of the transmission of energy. The smaller the system and the greater the distance involved, the poorer the resulting coupling. Various coil designs and electric circuit designs are available to counteract these circumstances. It has emerged that the magnetic properties of the vehicle undercarriage have a major influence upon the efficiency of the transmission of energy.

The incorporation of the secondary coil into the vehicle undercarriage is dependent upon the vehicle design. There are vehicles in which, in the immediate vicinity of the secondary coil, virtually no metallic components are present whereas in turn, in other vehicle designs, the secondary coil can be very tightly enclosed, e.g. by an aluminum sheet.

As the secondary coil is or needs to be fitted to the vehicle in a highly exposed position (with a resulting hazard of impact from stones, ground contact of the vehicle floor at the location of the secondary coil, etc.), the latter is protected by a cover on its underside. This cover also closes the gap at the edge of the coil, in order to prevent the "latch-on" of foreign bodies. Accordingly, for example, a branch projecting above ground level cannot "latch on" and remove the coil during travel.

Optimization of the magnetic flux by the secondary coil, as a result of space restrictions in the region of the vehicle undercarriage, is only possible to a limited extent. If it is intended that a structurally identical secondary coil is to be employed as a modular element or standard component in a variety of vehicle types, the adaptation of the magnetic flux to the specific vehicle type will be practically impossible. However, this may be necessary if, for example, due to major variations in the undercarriage clearance, the absence of a "strict" rectangular form in the border of the secondary coil, or the presence of metallic components at specific points in the undercarriage, the minimization of the magnetic flux is required. In the absence of optimization according to the specific vehicle type, high losses in energy transmission in particular may occur as a result.

The secondary coil itself, due to its high complexity, is not appropriate for adaptation to specific conditions of a vehicle. This would otherwise involve adaptations of exceptional complexity for each individual vehicle type, with in particular associated cost disadvantages. In structural terms, however, the cover, which is designed for the protection of the secondary coil, is a "simpler" component which, in many cases, must be adapted to the vehicle in any event, as the secondary coil can be attached to the vehicle by way of the cover. It is therefore proposed that vehicle-specific optimizations are achieved via the cover.

Specifically, it is proposed that the cover of the secondary coil is employed for the accommodation of magnetically-conductive components, for the purposes of field guidance. Thus, for example, ferrites can be incorporated in the cover, which support the magnetic flux. The efficiency of energy transmission can be enhanced accordingly.

Ferrites can be employed, and also the form thereof can be configured, such that the field characteristic is optimized, and a minimum magnetic transfer resistance is present between the secondary coil and the supporting ferrites. This reduces the strength of stray fields, which occur in the region of the secondary coil and the ferrites. By utilizing ferrite components of different size, and the specific positioning thereof, a variable configuration of the border of the secondary coil can be obtained, and the best possible detailed adaptation to the specific undercarriage structure of the vehicle can be achieved. Thus, by the use of ferrites, for example, relatively small structures can be magnetically employed in a targeted manner in the undercarriage region. Moreover, by way of the selected size of the components, and depending upon the length thereof relative to the secondary coil, compensation of a slightly rotated or a slightly offset installation of the coil relative to the customary vehicle axes can be achieved.

In vehicles having optimum vehicle undercarriage conditions and a small undercarriage clearance, it may be possible for the fitting of ferrite components to be omitted. It is possible that a cover can be used for a plurality of vehicle types, wherein the cover is only modified by way of a different number of ferrite components, or differences in the sizes thereof. A further instance of application occurs where, with respect to axle geometry, the vehicle undercarriages of two vehicle types are identical, but where an alteration of field guidance is appropriate on the grounds of differences in vehicle motorization (with the engine arranged in the immediate vicinity of the secondary coil). Different field guidance is achieved by a different layout of magnet guide elements.

A further option for the optimization of the energy flux involves the prevention of a further propagation of the stray magnetic field by the employment of a screening plate. The operating principle is as follows. In the screening plate, eddy currents are induced which prevent the penetration of the magnetic field into the plate, and thus also prevent the magnetic field reaching the region behind the plate (relative to the primary coil). Ferromagnetic components, such as e.g. an iron screw, or interference-sensitive components, such as e.g. electric control circuits, can be shielded accordingly. The screening plate, in the same way as the ferrite components, can likewise be secured by way of a receiving device incorporated in the cover.

To summarize, in this manner, an advantageous and vehicle-type-specific coil integration is achieved, which is applicable to a one-part secondary coil. Components which are necessary or are present in any event (in this case, the cover) are functionally extended such that the magnetic flux is supported. The secondary coil itself, as a complex high-voltage component, is not affected. Optimization of the magnetic flux in an inductive charging system, and thus the improvement of transmission properties, is thus simply, effectively and cost-effectively achieved. This is associated, for example, with improved energy efficiency, and an enlargement of the tolerable displacement of the secondary coil relative to the primary coil during charging, if the vehicle is offset in relation to the optimum position relative to the primary coil. Specifically, an option for adjustment to the specific situation of a vehicle type is provided, without the necessity for the modification of the secondary coil itself. Technically, modifications to this component are extremely complex and cost-intensive. Instead, a vehicle-type-specific cover for the coil, with insertable ferrites, is employed.

Other objects, advantages and novel features of the present invention will become apparent from the following detailed description of one or more preferred embodiments when considered in conjunction with the accompanying drawings. Identical technical components are identified by the same reference symbols.

DETAILED DESCRIPTION OF THE DRAWINGS

Figure 1:
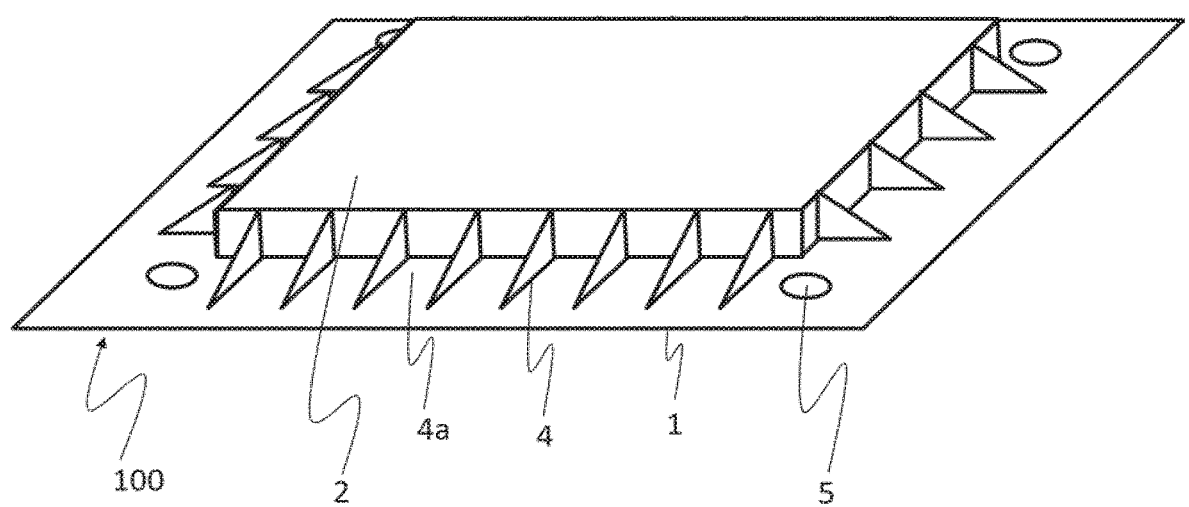
FIG. 1 shows a vehicle-mounted electromagnetic coil unit with cover (viewed from the side facing the vehicle).

FIG. 1 shows an electromagnetic coil unit (100) for a vehicle. The electromagnetic coil (2), namely a secondary coil for the inductive charging of an energy store of a vehicle, is covered by a cover device (1). The cover (1) thus incorporates the secondary coil, and functions as a connecting element between the undercarriage of a vehicle and the coil unit. The view of the coil unit represented in FIG. 1 discloses the side facing the vehicle undercarriage. The cover device incorporates penetrations (5), in the form of a pattern of holes for fasteners such as screws, which are employed for the attachment of the cover device, and thus the coil unit, to the vehicle undercarriage. The cover is preferably formed of a plastic material. The cover device incorporates a plurality of recesses (4a). Support wedges (4), which reinforce the cover device, also form part of the demarcation of the recesses.

Figure 2:
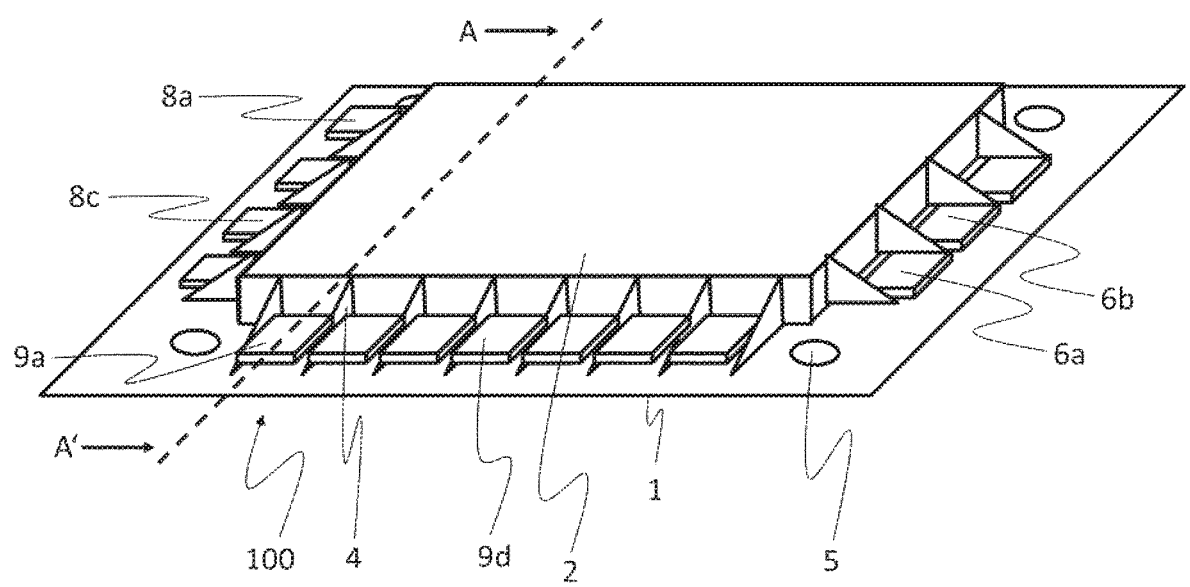
FIG. 2 shows a coil unit according to FIG. 1, with magnet guide elements.

FIG. 2 shows a coil unit according to FIG. 1, in which magnet guide elements (6a, 6b, 8a, 8c, 9a, 9d) are inserted into the recesses. In accordance with a further preferred embodiment according to FIG. 3, individual pairs comprised of one recess and one magnet guide element are configured individually. This proceeds from the fact that the cover device and the magnet guide elements are adapted to the undercarriage of the vehicle. In other words, the coil (2), as a standard component, can be magnetically and structurally adapted to the relevant vehicle type by use of the cover device and the size and/or shape of the magnet guide elements. Specifically, the recesses can also be arranged piece-by-piece, i.e. not arranged circumferentially, or the magnet guide elements are not arranged around the complete circumference of the coil. A missing or empty recess of this type, also described as an absent recess, is identified in FIG. 3 by the reference symbol (4b). It is thus not necessary for the magnet guide elements to be arranged with an equidistant spacing. By means of a specific width and/or arrangement of the support elements (4), the position of each individual magnet guide element can be determined individually.

Figure 4A:
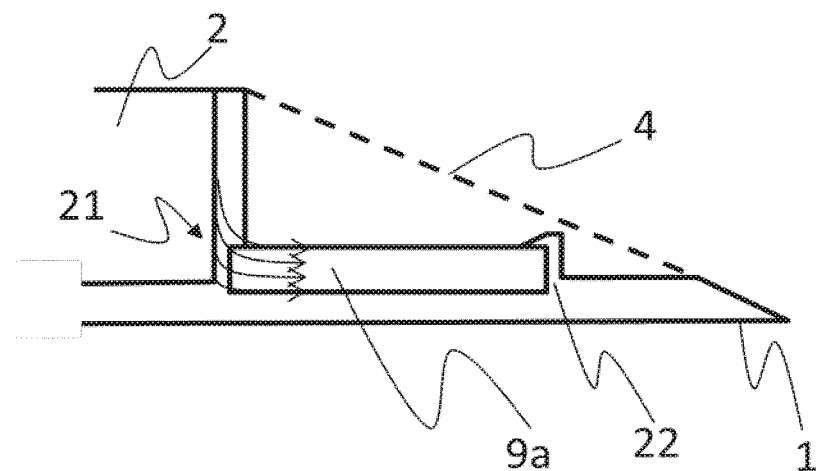
FIG. 4A shows a preferred form of embodiment (sectional view at A-A' in FIG. 1, in the region of a magnet guide element).
Figure 4B:
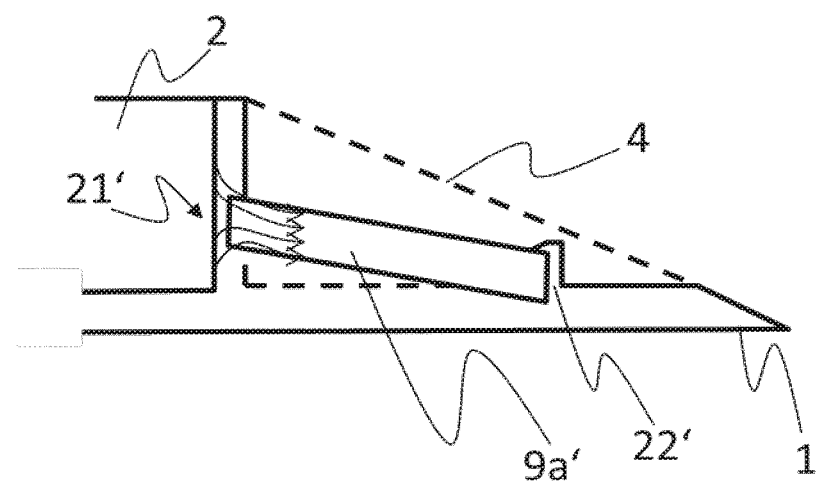
FIG. 4B shows a further preferred form of embodiment (sectional view at A-A' in FIG. 1, in the region of a magnet guide element).
Figure 4C:
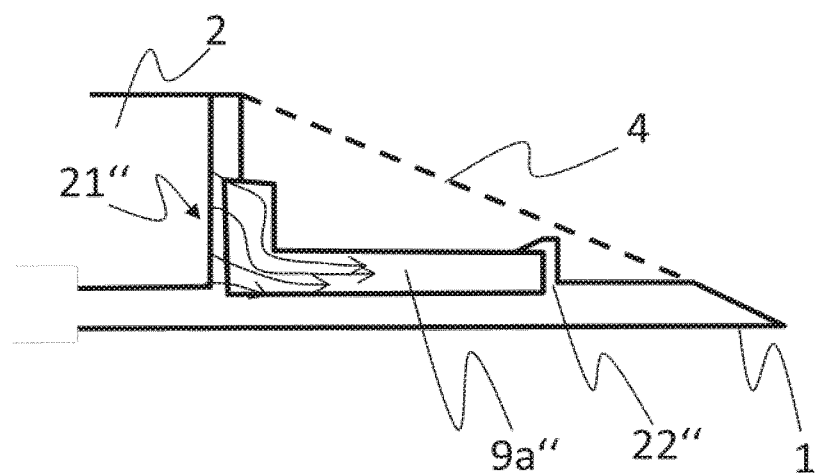
FIG. 4C shows a further preferred form of embodiment (sectional view at A-A' in FIG. 1, in the region of a magnet guide element).

FIGS. 4A to 4C represent the section A-A' in FIG. 2, in the region of a magnet guide element. According to FIGS. 4A to 4C, the cover device (1) incorporates a system comprised of a slot (21, 21', 21") and a clip (22, 22', 22"), in which a magnet guide element (9a, 9a', 9a") can be accommodated in a form-fitted arrangement. The magnet guide element is formed of a ferritic material. In FIGS. 4A to 4C, the magnetic field lines of the alternating electromagnetic field at a specific point in time are represented by arrows. The ferrite guides the field lines, and thus prevents the occurrence, for example, of eddy current losses in the vehicle structures. As a result of the high permeability, the magnetic field lines "follow" the ferrite, and thus penetrate other structures, for example on the vehicle undercarriage, to a lesser extent. The ferrite thus contributes to an effective enlargement of the useful diameter of the coil.

According to FIG. 4A, the ferrite is configured in a cuboid form, with a rectangular cross section. This is a simple, cost-effective and robust form of embodiment. A more complex form is represented in FIG. 4B, which shows a prism with a cross section in the form of a parallelogram. This provides the advantage of a superior coupling of the magnetic flux in the magnet guide element, as indicated by the magnetic field lines. According to FIG. 4C, the ferrite can also be configured in the form of a shank, in the interests of the further improvement of coupling.

Figure 3:
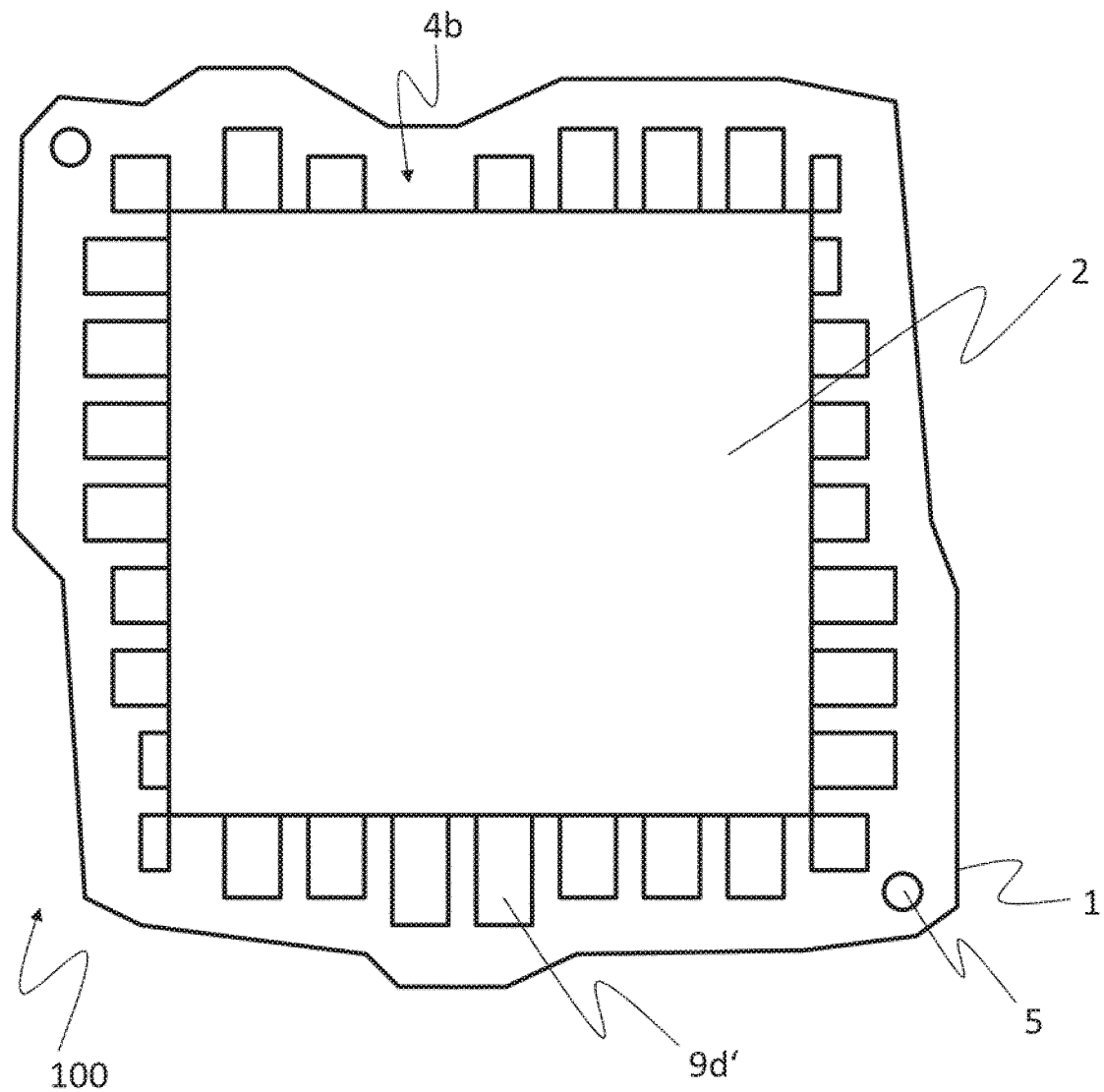
FIG. 3 shows a vehicle-mounted electromagnetic coil unit (viewed from above, i.e. viewed from the side facing the vehicle).

According to one variant, it is possible for all the magnet guide elements and recesses to be of identical design, with respect to size and shape. As can be seen from FIG. 3, however, it is preferred if in each case a magnet guide element is individually adapted to a recess, such that a plurality of magnet guide elements are of different design, with respect to their respective shape and size. Specifically, for exemplary purposes, the magnet guide element ($9d'$) from FIG. 3 which is perpendicular to the coil plane and, in the view of FIG. 3, perpendicular to the drawing plane, can be of a different thickness than that of the adjoining magnet guide elements for example. The dimensions of the individual magnet guide elements are determined with respect to the best possible occupation of the structural space between the cover device fitted to the undercarriage and the vehicle undercarriage. The cover (1) and the magnet guide elements from FIG. 3 are thus adapted to the undercarriage of a specific vehicle type. The adaptation is achieved by means of the outline of the cover, by the size of the recesses, and by the size and shape of the magnet guide elements.

According to another form of embodiment, for a different vehicle type, a differently-tailored cover will be produced, with a different number, and a different size and shape, of the respective magnet guide elements. Advantageously, the covers of these different forms of embodiment are appropriate for the accommodation of the same secondary coil.

LIST OF REFERENCE SYMBOLS

1 Cover
2 Electromagnetic coil, covered
4 Support wedge
4a Recess
4b Absent recess
5 Fixing means
6a, 6b, 8a, 8c, 9a, 9d One magnet guide element respectively
9a, 9a', 9a", 9d' One magnet guide element respectively
21, 21', 21" One slot respectively
22, 22', 22" One clip respectively
100 Electromagnetic coil unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cover device for an electromagnetic coil configured for inductive transmission of energy between the electromagnetic coil and an electromagnetic counter-coil, the cover device comprising:
   a cover at least partially configured as a housing for the electromagnetic coil, wherein:
      the cover is configured for attachment thereof to an undercarriage of a vehicle,
      the cover incorporates a plurality of recesses for magnet guide elements,
      the recesses are configured such that at least one magnet guide element is insertable into each recess, and
      the recesses are arranged outside of a circumference of the electromagnetic coil, and
   at least one magnet guide element inserted into each of the plurality of recesses, wherein:
      at least some of the magnet guide elements are configured in the form of a prism, with a parallelogrammatic cross section, and/or
      at least some of the magnet guide elements are configured in the form of a winged cuboid.

2. The cover device as claimed in claim 1, wherein the cover is provided with respective fixing devices for each insertable magnet guide element.

3. The cover device as claimed in claim 2, wherein each of the fixing devices is configured as a clamp.

4. The cover device as claimed in claim 3, wherein the clamp is provided with a slot and/or a clip.

5. The cover device as claimed in claim 1, wherein the magnet guide elements are configured in the form of a prism, with a parallelogrammatic cross section.

6. The cover device as claimed in claim 1, wherein the magnet guide elements are configured in the form of a winged cuboid.

7. The cover device as claimed in claim 1, wherein some of the magnet guide elements are of cuboid design.

8. The cover device as claimed in claim 1, wherein the magnet guide elements are comprised of a soft magnetic material.

9. The cover device as claimed in claim 8, wherein the soft magnetic material is a ferrite material.

10. The cover device as claimed in claim 1, further comprising:
    a screening plate for the cover.

11. The cover device as claimed in claim 1, wherein the cover incorporates at least one fastener for attaching the cover to the undercarriage of the vehicle.

12. The cover device as claimed in claim 1, further comprising a slot arranged between the electromagnetic coil and at least one recess of the plurality of recesses.

13. An electromagnetic coil unit, comprising:
    an electromagnetic coil configured for inductive transmission of energy between the electromagnetic coil and an electromagnetic counter-coil;
    a cover at least partially configured as a housing for the electromagnetic coil, wherein:
       the electromagnetic coil is connected to the cover,
       the cover is configured for attachment thereof to an undercarriage of a vehicle,
       the cover incorporates a plurality of recesses for magnet guide elements, the recesses being configured such that at least one magnet guide element is insertable into each recess, and
       the recesses are arranged outside of a circumference of the electromagnetic coil, and
    at least one magnet guide element inserted into each of the plurality of recesses, wherein:
       at least some of the magnet guide elements are configured in the form of a prism, with a parallelogrammatic cross section, and/or
       at least some of the magnet guide elements are configured in the form of a winged cuboid.

14. The electromagnetic coil unit as claimed in claim 13, wherein
    the magnet guide elements are configured in a prism form with a parallelogrammatic cross section.

15. The electromagnetic coil unit as claimed in claim 13, wherein
    the magnet guide elements are configured in a winged cuboid form.

16. The electromagnetic coil unit as claimed in claim 13, wherein
some of the magnet guide elements are of cuboid design.

17. A vehicle, comprising:
an undercarriage of the vehicle;
an electromagnetic coil unit attached to the undercarriage of the vehicle, wherein the electromagnetic coil unit comprises:
an electromagnetic coil configured for inductive transmission of energy between the electromagnetic coil and an electromagnetic counter-coil;
a cover at least partially configured as a housing for the electromagnetic coil, wherein:
the electromagnetic coil is connected to the cover,
the cover is configured for attachment thereof to an undercarriage of a vehicle,
the cover incorporates a plurality of recesses for magnet guide elements, the recesses being configured such that at least one magnet guide element is insertable into each recess,
the undercarriage or components of the vehicle located in a region of the undercarriage delimit the plurality of recesses in the cover and the magnet guide elements insertable into the recesses, and
the recesses are arranged outside of a circumference of the electromagnetic coil, and
at least one magnet guide element inserted into each of the plurality of recesses, wherein:
at least some of the magnet guide elements are configured in the form of a prism, with a parallelogrammatic cross section, and/or
at least some of the magnet guide elements are configured in the form of a winged cuboid.

\* \* \* \* \*